(12) United States Patent
O'Keeffe et al.

(10) Patent No.: US 6,580,419 B1
(45) Date of Patent: Jun. 17, 2003

(54) DROP RESISTANT CORDLESS MOUSE

(75) Inventors: Denis O'Keeffe, Newmarket (IE); Niall White, Thurles (IE)

(73) Assignee: Logitech Europe, S.A., Romanel-sur-Morges (CH)

( * ) Notice: Subject to any disclaimer, the term of this patent is extended or adjusted under 35 U.S.C. 154(b) by 0 days.

(21) Appl. No.: 09/336,351

(22) Filed: Jun. 18, 1999

(51) Int. Cl.[7] ................................................. G09G 5/08
(52) U.S. Cl. ..................... 345/163; 345/156; 345/157; 345/158; 345/164; 345/165; 345/166; 345/167
(58) Field of Search ............................. 345/163, 164, 345/165, 166, 167, 156, 157, 158

(56) References Cited

U.S. PATENT DOCUMENTS

| | | | | |
|---|---|---|---|---|
| 5,528,265 A | * | 6/1996 | Harrison | 345/158 |
| 5,745,055 A | * | 4/1998 | Redlich et al. | 341/20 |
| 5,894,302 A | * | 4/1999 | Scenna et al. | 345/163 |
| 6,005,553 A | * | 12/1999 | Goldstein et al. | 345/163 |
| 6,097,371 A | * | 8/2000 | Siddiqui et al. | 345/164 |
| 6,124,846 A | * | 9/2000 | Goldstein et al. | 345/163 |

* cited by examiner

*Primary Examiner*—Richard Hjerpe
*Assistant Examiner*—Jean Lesperance
(74) *Attorney, Agent, or Firm*—Townsend and Townsend and Crew LLP

(57) ABSTRACT

A computer mouse which has a number of features protecting it from damage when dropped. Additionally, the mouse of the invention is designed with features that make it more easily graspable and less likely to drop out of a user's hand in the first place. Finally, aesthetic features are built in to the design of the drop-resistant features. In one aspect, the present invention provides buttons on the top, front of the mouse which are recessed and shielded by a frame to avoid damage when dropped. In addition, the buttons are set back from the nose or front of the mouse so there would not be direct forces on the buttons if dropped on its nose. In another aspect, the invention provides a horizontal slot in an encoder shaft support assembly. Thus, the shaft is blocked from popping upward in a conventional slot arrangement when dropped.

6 Claims, 8 Drawing Sheets

Figure 1:
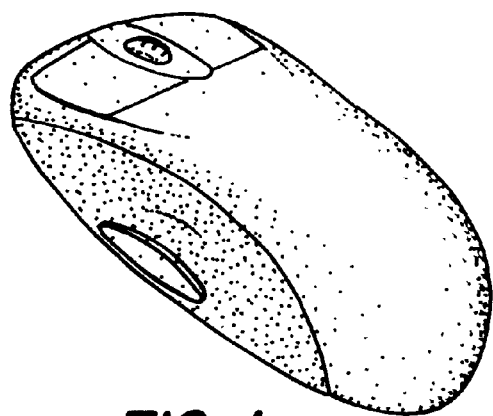
Figure 2:
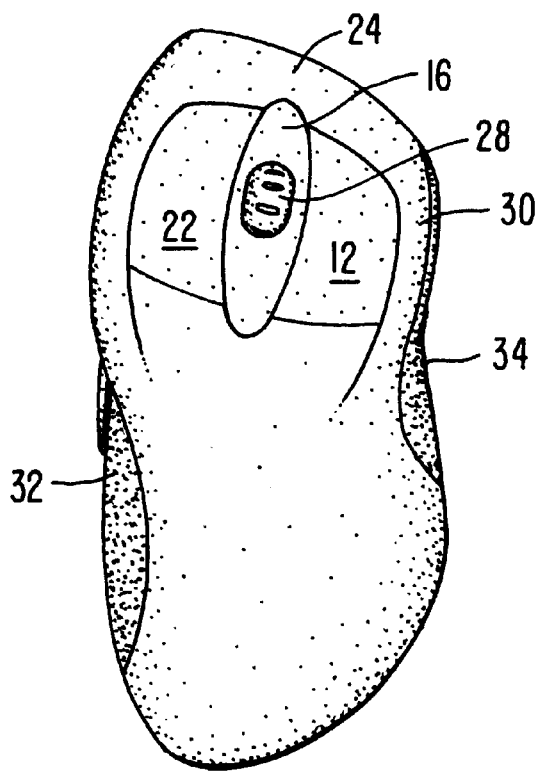
Figure 3:
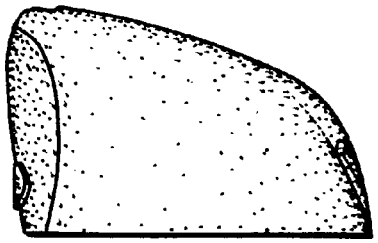
Figure 4:
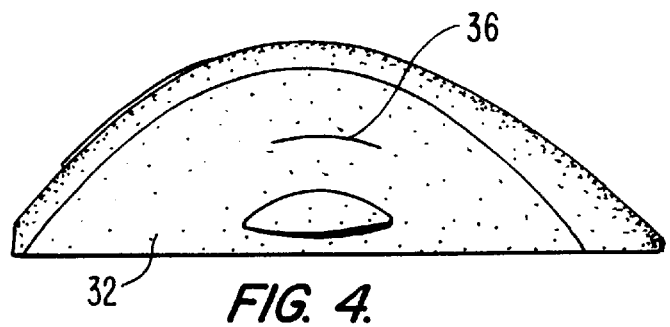
Figure 5:
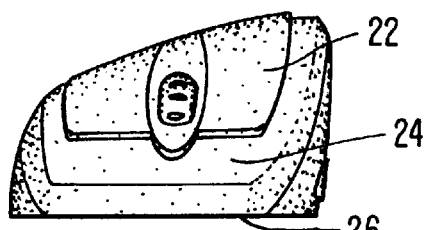
Figure 6:
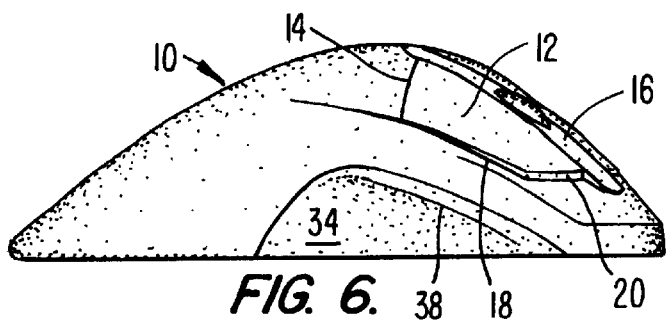
Figure 7:
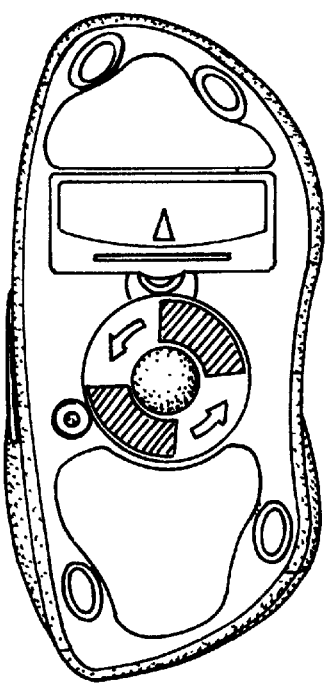
Figure 8:
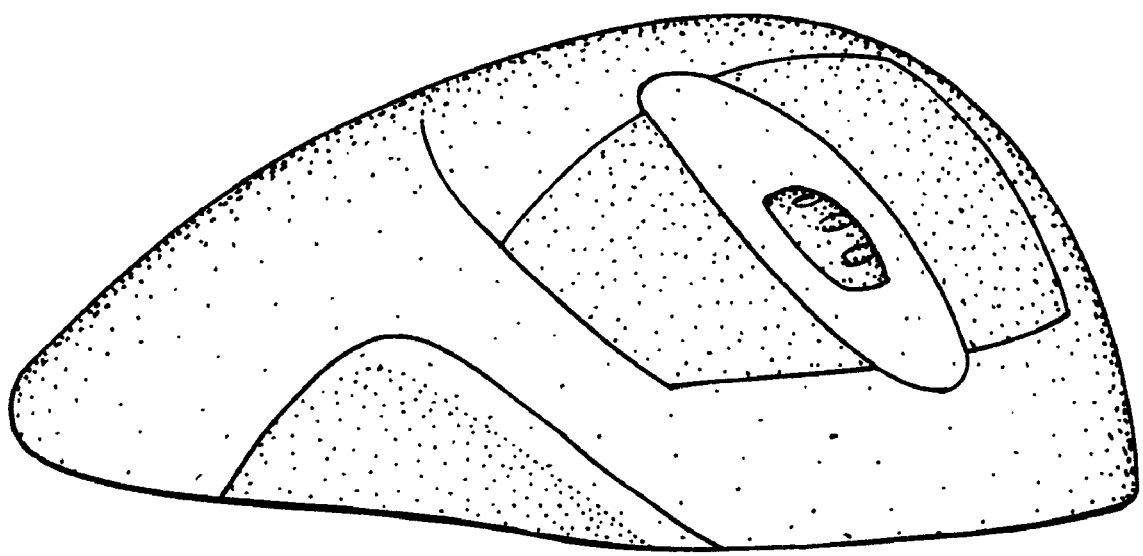
Figure 9:
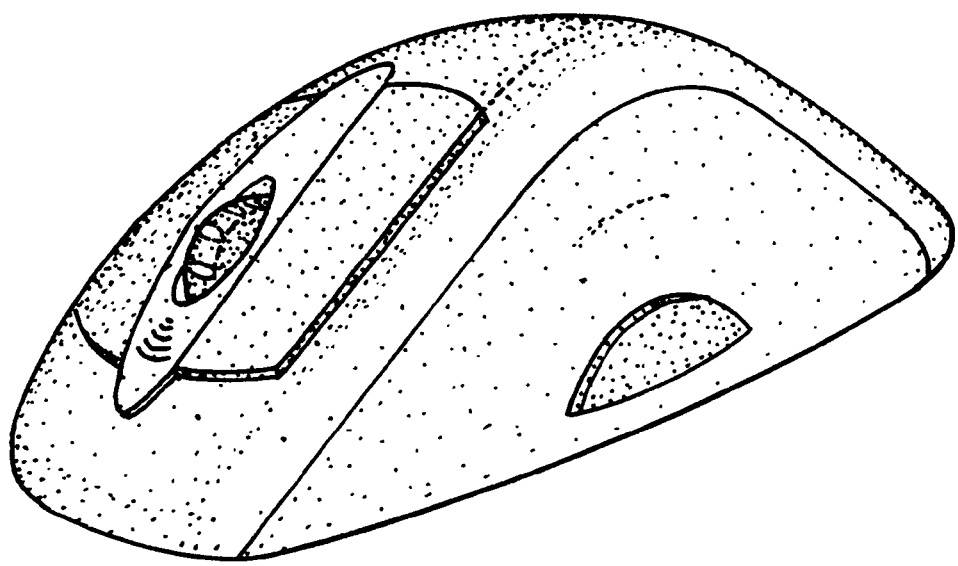

DROP RESISTANT CORDLESS MOUSE

BACKGROUND OF THE INVENTION

The present invention relates to computer mice, and in particular to mice designed to resist dropping and to be more easily graspable.

One of the challenges in designing a computer mouse today is the need to balance a low cost, easily manufactured mouse with one that is robust and resistant to damage when dropped or otherwise abused. A tradeoff to be made when designing a mouse to be more drop-resistant is that the mouse itself needs to be low cost to meet the competition, which translates into uncomplicated assemblies and ease of manufacturing.

SUMMARY OF THE INVENTION

The present invention provides a computer mouse which has a number of features protecting it from damage when dropped. Additionally, the mouse of the invention is designed with features that make it more easily graspable and less likely to drop out of a user's hand in the first place. Finally, aesthetic features are built in to the design of the drop-resistant and graspable features.

In one aspect, the present invention provides buttons on the top, front of the mouse which are recessed and shielded by a frame to avoid damage when dropped. In addition, the buttons are set back from the nose or front of the mouse so there would not be direct forces on the buttons if dropped on its nose.

In another aspect, the invention provides a horizontal slot in an encoder shaft support assembly. Thus, the shaft is blocked from popping upward in a conventional slot arrangement when dropped. Preferably, the slot in one support is coupled with a hole in the other support for receiving the other end of the shaft.

In another aspect of the invention, side panels are made of a softer plastic material, Santoprene in one embodiment. This improves the gripability on the sides of the mouse. In addition, both panels preferably have a sharp edge or ledge in the Santoprene panel for the fingers to grasp against.

The overall shape of the mouse of the invention also improves its ability to be grasped and avoid dropping. In particular, a surface is provided in-between the buttons for resting the index finger. In addition, space is provided in front of the buttons for the fingertips. The buttons themselves are flush with at least a portion of the top housing, in particular the back and middle portions. The front and side portions may be beveled on the buttons so that the user can feel where the buttons begin from the sides. At the same time, the user is able to grasp the mouse without activating the buttons due to the combination of the support region for the index finger and the flushness of the buttons in the middle and back portions near where the fingers would rest when grasping.

The right and left soft panels are mounted to be flush with the housing. The edges deform into a press fit with a rib on the top housing. The panel is held in place by a number of projections which fit into corresponding openings in the housing frame to secure the panel in place. The projections are preferably formed by a dual injection molding process with the rest of the panel.

For a further understanding of the nature and advantages of the invention, reference should be made to the following description taken in conjunction with the accompanying drawings.

BRIEF DESCRIPTION OF THE DRAWINGS

FIG. 1 is a perspective view of a mouse according to the invention.

FIG. 2 is a top plan view of the mouse of FIG. 1.

FIG. 3 is a back view of the mouse of FIG. 1.

FIG. 4 is left side plan view of the mouse of FIG. 1.

FIG. 5 is front plan view of the mouse of FIG. 1.

FIG. 6 is a right plan view of the mouse of FIG. 1.

FIG. 7 is a bottom plan view of the mouse of FIG. 1.

FIG. 8 is a perspective view illustrating the right side panel.

FIG. 9 is a perspective view illustrating the left side panel.

FIG. 10 is a diagram of the inside of the left side panel.

FIG. 11 is an inside view of the top part of the housing before receiving the panels.

FIG. 12 is a view of a portion of the inside of the bottom plate illustrating the horizontal shaft encoder slot.

FIG. 13 is a perspective view of the circuit boards inside the mouse.

FIG. 14 is a view of a portion of the embodiment of FIG. 13, illustrating the separation of the connector between the circuit boards.

FIG. 15 is a diagram of a key plate.

DESCRIPTION OF THE SPECIFIC EMBODIMENTS

FIGS. 1–7 illustrate the overall shape of the mouse of the preferred embodiment of the invention. As can be seen, the sloped housing supports the hand in a pronated position. As best seen in FIGS. 5 and 6, the two front buttons of the mouse are entirely surrounded by a frame of the top housing of the mouse. In particular, as shown in FIG. 6, a button 12 is flush with the housing at a rear portion 14 and along a center portion 16 of the mouse top housing 10. The button has beveled edges along a side 18 and along a front 20. The beveled edges extend slightly underneath the inside of a top housing 10, and are slightly exposed, allowing a user to feel where the position of the button is.

As is evident from FIG. 5, the second button 22 has a similar flush edge at the top and middle, and beveled edge on the side and front. Also, both buttons are set back from the front nose of the mouse, with a region 24 of the housing separating the front of the buttons from the nose 26 of the mouse. As can be seen, the rounded shape of the mouse supports a user's hand in a cupped, pronated position. The sloping from right to left evident in FIG. 5 (which is actually a left to right slope from the rear view as evident from FIG. 3) keeps the hand in a pronated position, while the front to rear curvature allows the hand to be cupped.

As evident from FIG. 2, a user's forefinger can activate button 22, but also can rest on a portion of a middle area 16 of the mouse. The index finger can activate a roller 28 or simply rest on middle portion 16 of the mouse. The ring finger can activate button 12. One possible grip is to have the forefinger partly resting on area 16, the index finger also partly on 16, and the tip of the index finger partly on front area 24. The thumb would grip side panel 32, while the little finger or alternately the ring finger could grip side panel 34.

The side panels are preferably made of a grippable material, preferably a softer material, such as a thermoplastic elastomer, such as Santoprene™ available from Advanced Elastomer Systems. In addition, as evident in FIG. 4, panel 32 has an indentation which forms an upper ridge 36. Similar, as evident from the view of FIG. 6, side panel 34 includes a similar indent forming a ridge 38. These ridges enhance the graspability of the mouse. In addition, they provide user comfort and are pleasing to the user's touch. The ridges are also visible in better detail in the drawings of FIGS. 8 and 9.

Figure 10:
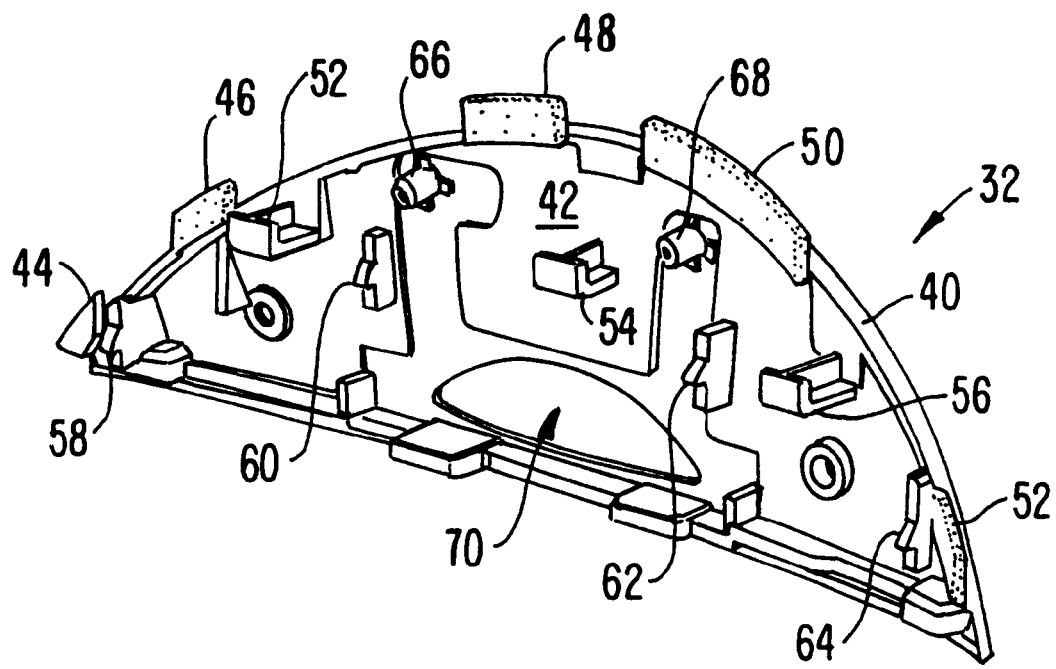

FIG. 10 illustrates side panel 32 in more detail. The panel is preferably made by a dual-injection molding process. One part of the mold forms the Santoprene exterior 40, which is molded together with an inner plastic frame 42. Inner frame 42 has five upward projecting ridges for mating with corresponding slots in the top housing of the mouse. These ridges are ridges 44, 46, 48, 50, and 52. Also providing for hooking with the main housing are three hook protrusions 52, 54, and 56. Finally, several protrusions with triangular-shaped knobs are provided for connecting to the housing, identified as 58, 60, 62, and 64.

Also provided are two posts 66 and 68 which support lever arms of a side button which extend down in one plastic piece to the button which protrudes through a hole 70. Thus button piece is not shown in this view.

Preferably, all the various protrusions and supports are part of the single piece of plastic 42, which is injection-molded together with outer thermoplastic elastomer panel 40 in the same process.

Figure 11:
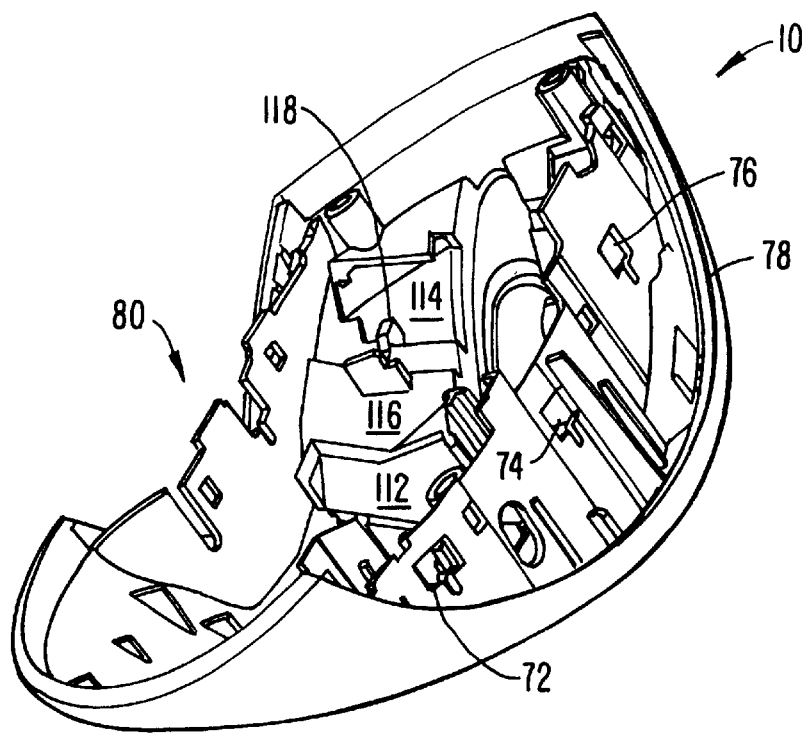

FIG. 11 is a view of top housing 10 from the inside. On the right side is the structure which meets with panel 32 of FIG. 10. For example, openings 72, 74, and 76 engage the three hooks 52, 54, and 56 of FIG. 10. The top of the panel 40 engages a small ridge 78 which covers only a portion of a width of the top of the Santoprene panel. This ridge provides a minimum contact area between the housing and the panel, enabling the soft material on the panel to be compressed easily to give a press-fit connection without any gap as the panel is secured to top housing 10. Alternately, the ridge could be on the panel.

A similar structure is used for the smaller panel, which is mounted into an opening 80 on the other side of the top housing.

Figure 12:
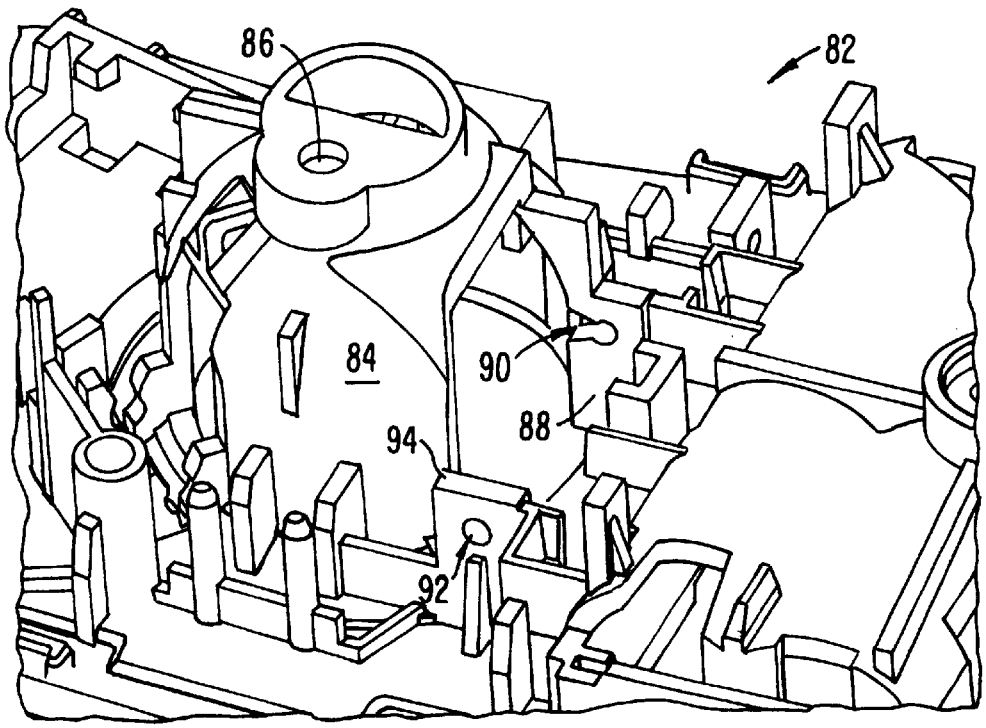

FIG. 12 illustrates a middle portion of the lower housing 82 of the mouse. In the center is a rounded ballcage 84, which is secured to the top housing with a screw through a hole 86. A shaft encoder support 88 has a horizontal slot 90 for receiving the shaft of the shaft encoder by press-fitting from the side. The other end of the shaft extends through a hole 92 in a second shaft encoder support 94. Thus, as can be seen, if dropped the shaft of the shaft encoder will not pop upward and out, since it is restrained in that direction. The second shaft encoder has a similar support arrangement, not visible in this view.

Figure 13:
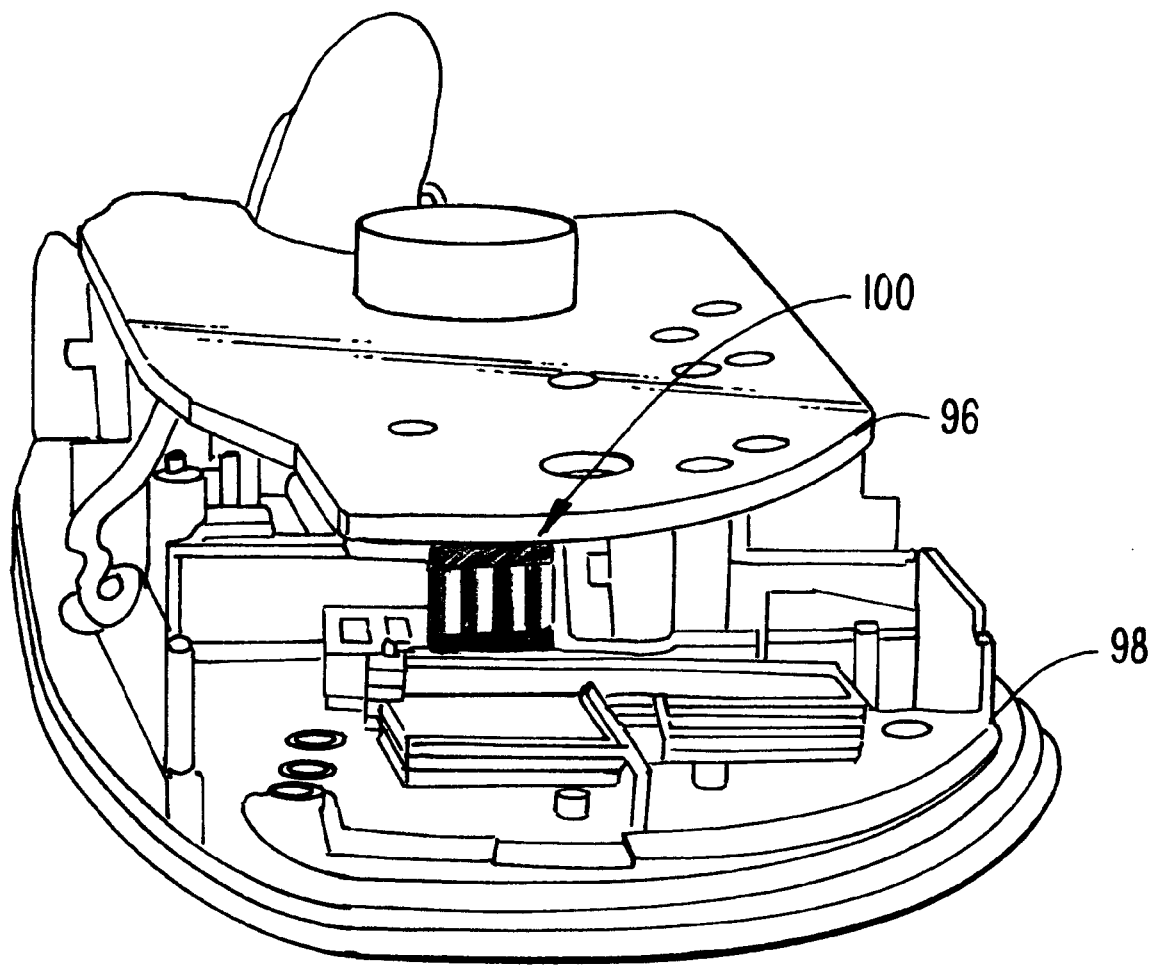
Figure 14:
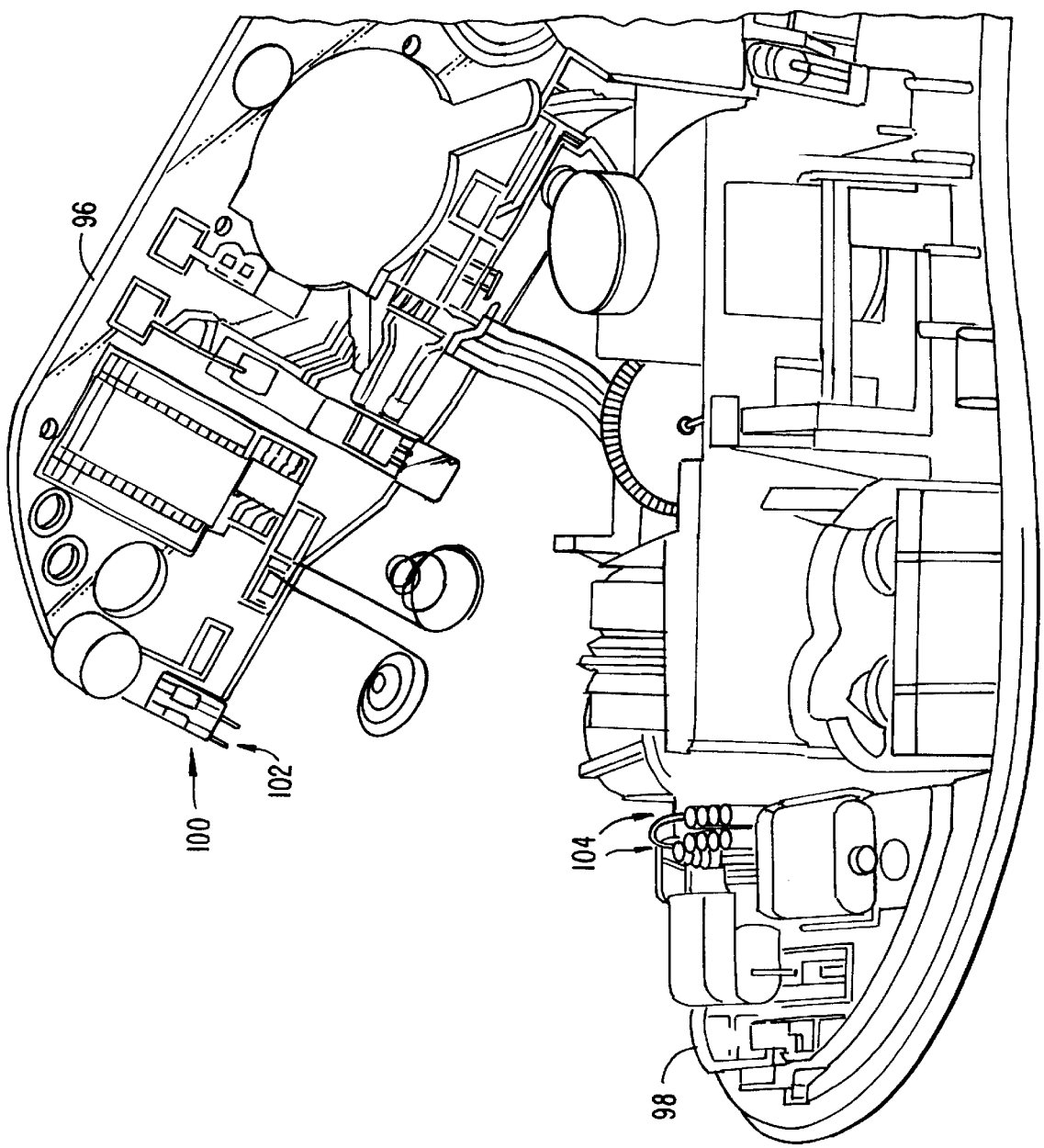

FIGS. 13 and 14 illustrate the two circuit boards, a top circuit board 96, and a lower, rear circuit board 98. The two circuit boards are held together by a stiff wire connector 100. As can be seen best in FIG. 14, eight protruding parallel rods 102, in two rows of four, insert into corresponding holes 104 in the female connector on bottom circuit board 98. This provides a rugged, rigid connector arrangement which is easily assembled without requiring soldering of a connector strap.

Figure 15:
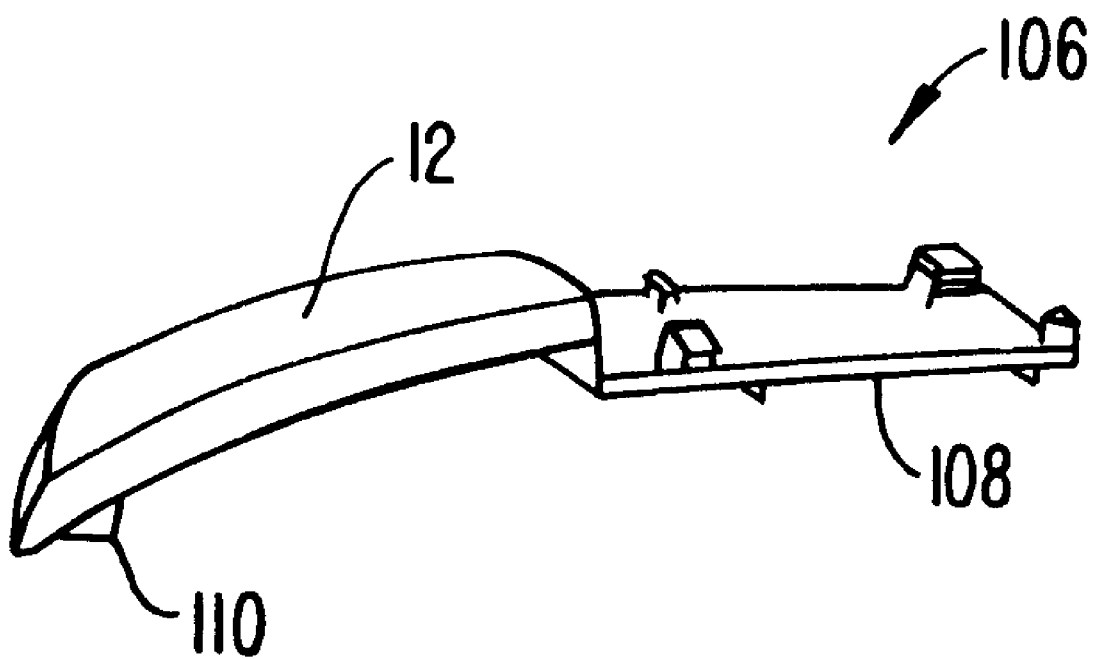

FIG. 15 illustrates the right side keyplate 106 with right side key 12 and a hinged portion 108. A protrusion 110 below key 12 activates a microswitch on a circuit board below. Referring back to FIG. 11, the key is assembled by inserting it through a hole 112 in the housing. The other exposed hole 114 in the housing is separated from hole 112 by a bridge 116. Bridge 116 includes a nub 118 which engages a slot inside protrusion 110, preventing it from completely lifting up.

Hinged portion 108 is mounted at an angle to key 112. Inside housing 10, it also angles towards the hinge of the other keyplate, forming a V inside the housing, rather than the two keyplate hinges being parallel. This allows the keyplate hinge to be substantially vertical despite the sloping edge of the outside of the housing. It also increases the available volume within the housing.

As will be understood by those of skill in the art, the present may be embodied in other specific forms without departing from the essential characteristics thereof. Accordingly, the foregoing description is intended to be illustrative, but not limiting of the scope of the invention which is set forth in the following claims.

What is claimed is:

1. A computer mouse comprising:

a bottom plate having a hole therethrough;

a top housing extending over said bottom plate, said housing having a top surface defining at least one elongated button opening and a roller opening disposed adjacent to said button opening near a front end of said housing, said button opening and said roller opening being surrounded by a frame of said top surface and said button opening and said roller opening being set back from said front end of said housing;

a button extending into said opening, said button having edges which are at least partially even with said frame, at least a rear edge of said button being substantially flush with said top surface;

a roller extending into said roller opening, said button opening and said button being set back from said front end of said housing, so as to leave a portion of said top housing separating the front of said button from said front end of said housing, a side panel made of a softer material than said housing;

a plurality of protrusions extending from said side panel for engaging said housing; and one of said housing and said side panel including a ridge along an upper edge, said ridge having a width less than a width of said side panel, such that said side panel compressed in the area of said ridge to forms a press fit with said housing without a gap.

2. A computer mouse comprising:

a bottom plate having a hole therethrough;

a top housing extending over said bottom plate, said housing having a top surface defining at least one elongated button opening and a roller opening disposed adjacent to said button opening near a front end of said housing, said button opening and said roller opening being surrounded by a frame of said top surface and said button opening and said roller opening being set back from said front end of said housing;

a button extending into said opening, said button having edges which are at least partially even with said frame, at least a rear edge of said button being substantially flush with said top surface;

a roller extending into said roller opening, said button opening and said button being set back from said front end of said housing, so as to leave a portion of said top housing separating the front of said button from said front end of said housing, a housing extending over said bottom plate, said housing having a top surface; and a side panel attached to said housing, said side panel being made of a softer material than said housing; and a ridge formed in said side panel to assist in gripping with a users fingers.

3. The mouse of claim 2 wherein a front edge of said frame is set back from a frontmost edge of said top housing.

4. The mouse of claim 2 wherein said button has a bevelled front edge and at least one bevelled side edge, and a front and corresponding side of said frame have a matching, inward sloping surface, such that a portion of said bevelled edge extends underneath said front and side of said frame in an undepressed position of said button.

5. The mouse of claim 2 further comprising:

at least one shaft encoder in contact with said ball; and a first support for said shaft encoder, said first support having a closed top and a horizontal slot for insertion of a shaft of said shaft encoder, proximate a first end of said shaft, so that said shaft cannot pop out in an upward direction.

6. The computer mouse of claim 5 further comprising:

a second support for said shaft encoder, said second support having a hole for receiving a second end of said shaft.

* * * * *